Oct. 31, 1961  G. W. JACKSON ET AL  3,006,363
CHECK VALVE
Filed Nov. 20, 1958

INVENTORS
George W. Jackson
Gene L. Dafler
BY
W. C. Staley
Their Attorney

United States Patent Office 3,006,363
Patented Oct. 31, 1961

3,006,363
CHECK VALVE
George W. Jackson and Gene L. Dafler, Dayton, Ohio, assignors to General Motors Corporation, Detroit, Mich., a corporation of Delaware
Filed Nov. 20, 1958, Ser. No. 775,280
4 Claims. (Cl. 137—525)

This invention relates to check valve structures adapted to control the flow of fluid through a passage so as to prevent flow in one direction through the passage but allow relatively free flow in the opposite direction. More particularly, the invention relates to a check valve for controlling the flow of air under pressure from a suitable source of pressure to a device adapted to receive the air under pressure, the check valve permitting substantially unrestricted flow of air from the source of air pressure to the device adapted to receive the air but which prevents air flow in the opposite direction.

An object of the invention is to provide an inexpensive check valve for controlling the flow of fluid wherein the check valve will be relatively noiseless in operation.

Another object of the invention is to provide a check valve for controlling flow of fluid wherein the check valve member is constructed from a rubber-like or elastomeric material, the check valve being formed with a body portion provided with a skirt portion that extends axially of the body portion with the skirt portion being provided with a sealing lip expansible into engagement with the air passage retaining the check valve to prevent flow of air through the passage in one direction against the skirt portion of the check valve, the body portion of the check valve having a central open area that is expansible to provide free flow of air through the check valve in one direction.

Further objects and advantages of the present invention will be apparent from the following description, reference being had to the accompanying drawings wherein preferred embodiments of the present invention are clearly shown.

Figure 1:
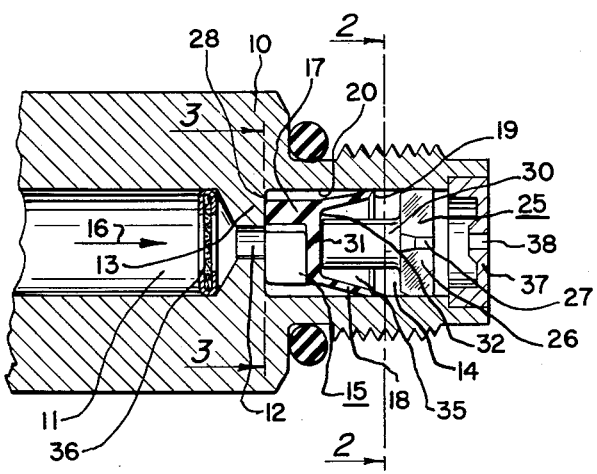
FIG. 1 is a longitudinal cross-sectional view of a check valve incorporating features of this invention.

In this invention the check valve consists of a body 10 having a longitudinally extending axially disposed passage 11 that forms the inlet passage for fluid under pressure for flow through the check valve body 10. The passage 11 terminates at one end in a passage 12 provided in the wall 13 that extends transversely of the body 10 to separate the passage 11 from the passage or chamber 14 that is axially disposed in alignment with the passage or chamber 11 and the passage 12.

The chamber 14 receives the check valve element 15 which controls flow of fluid through the check valve body 10 to allow relatively unrestricted flow of fluid in the direction of the arrow 16, but which prevents flow of fluid in the return direction.

The check valve element 15 consists of a generally cylindrical body portion 17 that is of a diameter somewhat smaller than the diameter of the chamber 14, chamber 14 being cylindrical in contour. The body portion 17 consists of three axially extending finger-like segments 17a, 17b and 17c each of which has a transverse cross section that is generally ellipsoidal in shape. The segments are in spaced generally parallel relationship to provide longitudinally extending passages 40, 40a and 40b between the segments that radiate from a central open area 45 that is in axial alignment with the passage 12 to provide thereby for free flow of fluid through the body portion 17.

The body portion 17 of the check valve has an outwardly flaring skirt portion 18 formed generally in the shape of a truncated cone with the small diameter of the cone portion being coextensive with the body portion 17 of the check valve, the skirt portion 18 flaring outwardly to the large diameter portion of the cone-shaped structure and terminating in a sharp-edged lip 19 that forms a sealing lip to engage the wall 20 of the passage 14.

When the check valve element is positioned in the passage 14, as shown in FIG. 1, the flared skirt portion 18 will have the lip portion 19 contracted slightly by the diameter of the passage 14 so as to provide a small pressure seal against the surface 20 of the passage 14 and thereby insure contact of the entire periphery of the sealing lip with the cylindrical surface 20.

Figures 2, 3:
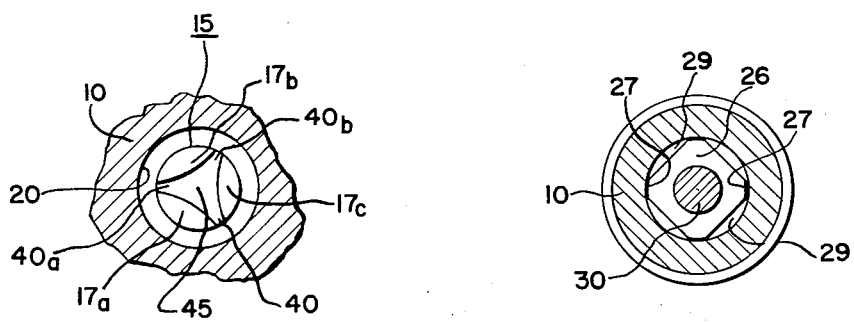
FIG. 2 is a transverse cross-sectional view taken along line 2—2 of FIG. 1.
FIG. 3 is a transverse cross-sectional view taken along line 3—3 of FIG. 1.
Figure 4:
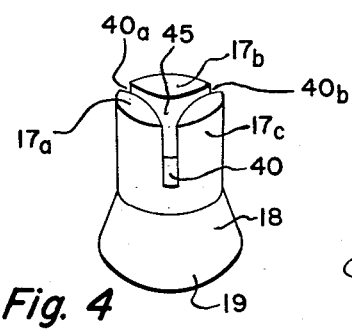
FIG. 4 is a perspective view of the check valve element.

The check valve element 15 is retained in position in the passage 14 by a stop member 25 frictionally retained within the passage 14 and in engagement with the wall 20 of the passage. This stop element 25 has an enlarged square head 26, as shown in FIG. 2, provided with arcuate corners 27 that engage the wall 20 of the passage 14 with sufficient friction to retain the stop member 25 in the predetermined spaced relationship relative to the wall 13.

Spaces 29 provided between the enlarged square head 26 and the periphery 20 of the passage 14 provide flow passages for fluid in either direction of flow in the passage 14.

The stop member 25 also has a forwardly extending cylindrical projection 30 that has its end face 31 in predetermined spaced relationship to the surface 28 of the transverse wall 13 and adapted to engage the wall surface 32 of the check valve element 15 to thereby limit the movement of the check valve element between the wall 28 and the end 31 of the stop member 25. This limited movement of the check valve member 15 avoids a purely static condition of the sealing lip 19 against the surface 20 of the passage 14 which would tend to cause the sealing lip 19 to stick to the surface 20 if the sealing lip remains static in one position over a prolonged period of time. This is particularly true since the check valve element 15 is made from a resilient rubber-like material, or an elastomeric material, which has a tendency to adhere to metal surfaces if left in a perfectly static condition over a long period of time.

From the foregoing description it will be apparent that if pressure fluid flows in the direction of the arrow 16, the skirt portion 18 of the check valve will be contracted by the flow of pressure fluid to allow the fluid to pass out the passage 14 to a device to be supplied by the pressure fluid. On the other hand, if pressure fluid flow attempts to reverse into the opposite direction, the pressure fluid engaging the hollow cup-shaped portion 35 of the check valve will tend to expand the skirt 18 radially outwardly to forcefully engage the sealing lip 19 with the peripheral surface 20 and thereby prevent fluid flow under pressure any direction opposite to that of the arrow 16.

A filter screen 36 can be provided in the passage 11 to eliminate dirt flowing through the check valve, and if desired, a member 37 can be provided in the outlet of the passage 14 with a restrictive passage 38 to restrict the flow of fluid in its movement through the check valve body.

While the embodiments of the present invention as herein disclosed constitute a preferred form, it is to be understood that other forms might be adopted.

What is claimed is as follows:

1. A check valve providing for flow of fluid in one direction, comprising, a body member having a wall provided with an opening in said wall for flow of fluid through the body and said wall, said body also having a chamber adjacent said wall coaxial with said opening, a valve member of resilient material positioned in said chamber, said valve member having a body portion comprising a plurality of axially extending segments each having a generally ellipsoidal contour in transverse cross section disposed relative to one another with their longitudinal axes generally parallel and each having a face at one end thereof engageable with said wall and positioned around said opening, said segments being in spaced relationship whereby to provide longitudinally extending passages between the said segments radiating from a central space encompassed by the said segments, said central space being in axial alignment with said opening in said wall, said body portion having an open-ended cup-shaped skirt portion extending from the opposite end of said body portion with the terminus end of said skirt portion providing a peripheral lip engaging the inner periphery of said chamber and expansible against said inner periphery to seal against pressure flow of fluid in a direction into said open-ended skirt portion and contractible from the inner periphery on pressure flow of fluid in the opposite direction to allow fluid flow in the said opposite direction, and a stop member positioned in said chamber adjacent the said skirt portion of said valve and engageable by said valve member to limit axial movement of the valve member relative to said wall by the spaced relationship of the stop member relative to said wall, said stop member having an enlarged head portion engaging the inner periphery of said chamber whereby to retain said stop member in position in said chamber relative to said wall, said stop member also having a stem portion projecting from said head portion coaxial therewith and coaxial with said valve member and said opening in said wall and projecting into the open-ended skirt portion of said valve member for engagement by said body portion whereby to limit the axial movement of the valve member relative to said wall by the spaced relationship between the end of said stem portion and said wall.

2. A check valve providing for flow of fluid in one direction, comprising, a body member having a wall provided with an opening in said wall for flow of fluid through the body and said wall, said body also having a chamber adjacent said wall coaxial with said opening, a one-piece valve member of rubber-like resilient material positioned in said chamber, said valve member having a body portion comprising a transversely extending imperforate wall having a plurality of axially extending segments extending from one side of said imperforate wall and disposed relative to one another with their longitudinal axes generally parallel and each having a radially disposed face at one end thereof engageable with said first-mentioned wall and positioned around said opening in an axially extending direction and having a cup-shaped skirt portion extending from the opposite side of said imperforate wall, said skirt portion having a peripheral lip engaging the inner periphery of said chamber expansible against said inner periphery during pressure flow in the opposite direction, and a separate stop member positioned in said chamber adjacent the said skirt portion of said valve member and engageable by said valve member to limit thereby axial movement of the valve member relative to said first-mentioned wall.

3. A check valve providing for flow of fluid in one direction, comprising, a body member having a wall provided with an opening in said wall for flow of fluid through the body and said wall, said body also having a chamber adjacent said wall coaxial with said opening, a one-piece valve member of rubber-like resilient material positioned in said chamber, said valve member having a body portion comprising a transversely extending imperforate wall having a plurality of axially extending segments extending from one side of said imperforate wall and disposed relative to one another with their longitudinal axes generally parallel and each having a generally ellipsoidal contour in transverse cross section and each having a face at one end thereof engageable with said first-mentioned wall and positioned around said opening in an axially extending direction, said body portion having an open-ended cup-shaped skirt portion extending from the opposite side of said imperforate wall with the terminus end of said skirt portion providing a peripheral lip engaging the inner periphery of said chamber and expansible against said inner periphery to seal against pressure flow of fluid in a direction into said open-ended skirt portion and contractible from the inner periphery on pressure flow of fluid in the opposite direction to allow fluid flow in the said opposite direction, and a stop member secured within said chamber adjacent the open end of said skirt portion and having a projection extending into said skirt portion engageable by said imperforate wall to limit thereby axial movement of the valve member relative to said wall.

4. A check valve providing for flow of fluid in one direction, comprising, a body member having a wall provided with an opening in said wall for flow of fluid through the body and said wall, said body also having a chamber adjacent said wall coaxial with said opening, a one-piece valve member of rubber-like resilient material positioned in said chamber, said valve member having a body portion comprising a transversely extending imperforate wall having a plurality of axially extending segments extending from one side of said imperforate wall and disposed relative to one another with their longitudinal axes generally parallel and each having a generally ellipsoidal contour in transverse cross section and each having a face at one end thereof engageable with said first-mentioned wall and positioned around said opening in an axially extending direction, said segments being in spaced relationship to provide thereby longitudinally extending radially open passages between the said segments radiating from a central space encompassed by the said segments, said central space being in axial alignment with said opening in said first-mentioned wall, said body portion having an open-ended cup-shaped skirt portion extending from the opposite side of said imperforate wall with the terminus end of said skirt portion providing a peripheral lip engaging the inner periphery of said chamber and expansible against said inner periphery to seal against pressure flow of fluid in a direction into said open-ended skirt portion and contractible from the inner periphery on pressure flow of fluid in the opposite direction to allow fluid flow in the said opposite direction.

References Cited in the file of this patent

UNITED STATES PATENTS

| Number | Name | Date |
|---|---|---|
| 2,038,055 | Oliver | Apr. 21, 1936 |
| 2,329,960 | Verheul | Sept. 21, 1943 |
| 2,571,893 | Kendall | Oct. 16, 1951 |
| 2,815,041 | Rimsha | Dec. 3, 1957 |
| 2,833,306 | Cummings | Mar. 6, 1958 |
| 2,912,999 | Kersh | Nov. 17, 1959 |
| 2,925,093 | Brand | Feb. 16, 1960 |
| 2,930,399 | Babson | Mar. 29, 1960 |

FOREIGN PATENTS

| Number | Country | Date |
|---|---|---|
| 292,495 | Italy | Jan. 20, 1932 |
| 571,092 | Germany | Feb. 23, 1933 |